US012665520B2

(12) United States Patent
Chiba

(10) Patent No.: US 12,665,520 B2
(45) Date of Patent: Jun. 23, 2026

(54) SWITCHING POWER SUPPLY DEVICE

(71) Applicant: GS Yuasa International Ltd., Kyoto (JP)

(72) Inventor: Akiteru Chiba, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 189 days.

(21) Appl. No.: 18/836,167

(22) PCT Filed: Feb. 6, 2023

(86) PCT No.: PCT/JP2023/003731
§ 371 (c)(1),
(2) Date: Aug. 6, 2024

(87) PCT Pub. No.: WO2023/153349
PCT Pub. Date: Aug. 17, 2023

(65) Prior Publication Data
US 2025/0373168 A1 Dec. 4, 2025

(30) Foreign Application Priority Data

Feb. 8, 2022 (JP) ................................. 2022-017819
Feb. 8, 2022 (JP) ................................. 2022-017821
(Continued)

(51) Int. Cl.
*H02M 3/335* (2006.01)
*H02M 3/00* (2006.01)
(Continued)

(52) U.S. Cl.
CPC ......... *H02M 3/33571* (2021.05); *H02M 3/01* (2021.05); *H02M 3/285* (2013.01); *H02M 1/0077* (2021.05)

(58) Field of Classification Search
CPC .. H02M 3/33592; H02M 1/0067; H02M 3/01; H02M 3/33571; H02M 1/0043;
(Continued)

(56) References Cited

U.S. PATENT DOCUMENTS 6,297,976 B1 * 10/2001 Isono ................ H02M 3/33553
363/71
9,755,522 B2 * 9/2017 Dubus ................. H02M 3/1584
(Continued)

FOREIGN PATENT DOCUMENTS

JP 2006-0238695 A 9/2006
JP 2013-212011 A 10/2013
(Continued)

OTHER PUBLICATIONS

International Searching Authority, International Search Report and Written Opinion received for International Application No. PCT/JP2023/003731, dated Apr. 4, 2023, 13 pages, Japan Patent Office, Japan.

*Primary Examiner* — Yusef A Ahmed
(74) *Attorney, Agent, or Firm* — Buchalter LLP

(57) ABSTRACT

A resonant capacitor Crk (k is a natural number of one to n) of each circuit element has one end connected in series to a resonant reactor Lr and a primary winding N1 of a transformer T, and another end connected to the resonant capacitor Crk of another circuit element 10 so that a dimensional multiphase LLC converter having a phase difference of 360°/Pk is constructed by Pk (Pk is an optional natural number) of the circuit elements 10.

7 Claims, 15 Drawing Sheets

(30) Foreign Application Priority Data

| | | | |
|---|---|---|---|
| May 13, 2022 | (JP) | ................................. | 2022-079369 |
| May 13, 2022 | (JP) | ................................. | 2022-079371 |

(51) Int. Cl.

| | | |
|---|---|---|
| *H02M 3/28* | (2006.01) | |
| *H02M 1/00* | (2006.01) | |

(58) Field of Classification Search

CPC .. H02M 1/0064; H02M 1/0095; H02M 3/285;
H02M 1/0077; Y02B 70/10
See application file for complete search history.

(56) References Cited

U.S. PATENT DOCUMENTS

| | | | | |
|---|---|---|---|---|
| 10,256,739 | B2* | 4/2019 | Hao ......................... | H02M 3/01 |
| 10,658,937 | B1* | 5/2020 | Zafarana ............... | H02M 1/083 |
| 12,119,750 | B2* | 10/2024 | Drofenik ................. | H02M 3/01 |
| 12,149,178 | B2* | 11/2024 | Drofenik ............ | H02M 7/4815 |
| 12,368,384 | B2* | 7/2025 | Hu ..................... | H02M 3/33592 |
| 2008/0190906 | A1* | 8/2008 | Aigner .................. | H02M 3/335 |
| | | | | 219/130.21 |
| 2008/0298093 | A1* | 12/2008 | Jin ........................ | H02M 3/285 |
| | | | | 363/126 |
| 2010/0328968 | A1* | 12/2010 | Adragna ................. | H02M 3/01 |
| | | | | 363/21.02 |
| 2011/0069514 | A1* | 3/2011 | Chiba ..................... | H02M 3/01 |
| | | | | 363/21.02 |
| 2012/0262953 | A1* | 10/2012 | Jungreis ............ | H02M 3/33571 |
| | | | | 363/21.02 |

| | | | | |
|---|---|---|---|---|
| 2012/0275197 | A1* | 11/2012 | Yan .................... | H02M 3/33592 |
| | | | | 363/21.02 |
| 2012/0307529 | A1* | 12/2012 | Chiba ..................... | H02M 1/08 |
| | | | | 363/17 |
| 2014/0268891 | A1* | 9/2014 | Sigamani ................ | H02M 1/14 |
| | | | | 363/17 |
| 2016/0072388 | A1* | 3/2016 | Dubus ................. | H02M 3/3376 |
| | | | | 363/25 |
| 2016/0254756 | A1* | 9/2016 | Yang ................... | H01F 27/2823 |
| | | | | 363/21.02 |
| 2018/0006568 | A1* | 1/2018 | Adragna ................. | H02M 3/01 |
| 2018/0191168 | A1* | 7/2018 | Banaska ................. | H02M 3/01 |
| 2018/0342958 | A1* | 11/2018 | Ji ...................... | H02M 3/33571 |
| 2019/0109543 | A1* | 4/2019 | Adragna ................. | H02M 3/01 |
| 2019/0355506 | A1* | 11/2019 | Fei ...................... | H01F 27/2804 |
| 2019/0379291 | A1* | 12/2019 | Xue ...................... | H02M 7/219 |
| 2019/0379292 | A1* | 12/2019 | Fei ............................ | H01F 3/14 |
| 2020/0014306 | A1* | 1/2020 | Riar .................. | H02M 3/33584 |
| 2020/0350826 | A1* | 11/2020 | Adragna ................. | H02M 3/01 |
| 2021/0083590 | A1* | 3/2021 | Lu ........................... | H01F 38/08 |
| 2021/0408927 | A1* | 12/2021 | Zhang .............. | H02M 3/33592 |
| 2022/0103083 | A1* | 3/2022 | Zhou ..................... | H02M 1/348 |
| 2023/0009358 | A1* | 1/2023 | Li .................. | H02M 3/33573 |
| 2023/0223856 | A1* | 7/2023 | Sato ..................... | H02M 1/081 |
| | | | | 363/21.02 |
| 2025/0047210 | A1* | 2/2025 | Chiba .............. | H02M 3/33571 |
| 2025/0202375 | A1* | 6/2025 | Chiba ................... | H02M 3/01 |

FOREIGN PATENT DOCUMENTS

| | | | |
|---|---|---|---|
| JP | 2017-046536 | A | 3/2017 |
| JP | 6696617 | B1 | 5/2020 |
| JP | 2021-035200 | A | 3/2021 |

* cited by examiner (a)

(b)

(a)

One of connection points in
four-dimensional direction

1

2

3

(b)

1    2    3

1

2

3

One of connection points in
five-dimensional direction (c)

3

2

1

1

One of connection points in
six-dimensional direction

1

2

3

SWITCHING POWER SUPPLY DEVICE

CROSS REFERENCE TO RELATED APPLICATIONS

This application is a National Stage Application, filed under 35 U.S.C. § 371, of International Application No. PCT/JP2023/003731, filed Feb. 6, 2023, which international application claims priority to and the benefit of Japanese Application No. 2022-017819, filed Feb. 8, 2022, Japanese Application No. 2022-017821, filed Feb. 8, 2022, Japanese Application No. 2022-079369, filed May 13, 2022, and Japanese Application No. 2022-079371, filed May 13, 2022; the contents of all of which are hereby incorporated by reference in their entirety.

BACKGROUND

Technical Field

The present invention relates to a switching power supply device that converts input voltage into output voltage by using a plurality of LLC converters connected in parallel.

Description of Related Art

In recent years, in order to realize large current and a low ripple with increase in an output load, there is known a multiphase switching power supply device in which the number of operation phases (the number of phases) is more than one and phases are shifted to drive each operation phase (see, for example, JP 6696617 B2).

BRIEF SUMMARY

However, as the number of phases increases, the number of complementary gate drive signals of a complementary switch to be prepared also increases. Therefore, control associated with increase in the number of phases becomes also complicated, and a circuit related to control becomes large in scale and so on. Accordingly, power expansion by multiple phases has not been able to be easily performed.

One aspect of the present invention provides a switching power supply device capable of achieving high power without increasing the number of complementary gate drive signals.

A switching power supply device according to one aspect of the present invention includes, as circuit elements, a plurality of half-bridge LLC converters including a first switch element and a second switch element connected in series between a positive electrode and a negative electrode of a DC power supply, and a resonant circuit including a resonant reactor having one end connected to a connection point between the first switch element and the second switch element, a primary winding of a transformer, and n+1 (n is a natural number of three or more) of a zeroth order resonant capacitor to an n-th order resonant capacitor. In the switching power supply device, the zeroth order resonant capacitor of each of the circuit elements has one end connected in series to the resonant reactor, and the primary winding of the transformer, and another end connected to a power supply line, and a k-th order resonant capacitor (k is a natural number of one to n) of each circuit element has one end connected in series to the resonant reactor and the primary winding of the transformer, and another end connected to a k-th order resonant capacitor of another one of the circuit elements so that a k-th dimensional multiphase LLC converter having a phase difference of 360°/Pk is constructed by Pk (Pk is any natural number) of the circuit elements.

According to one aspect of the present invention, the complementary gate drive signal can be made smaller than the total number of circuit elements, and high power can be realized without increasing the complementary gate drive signal.

DETAILED DESCRIPTION OF VARIOUS EMBODIMENTS

Figure 1:
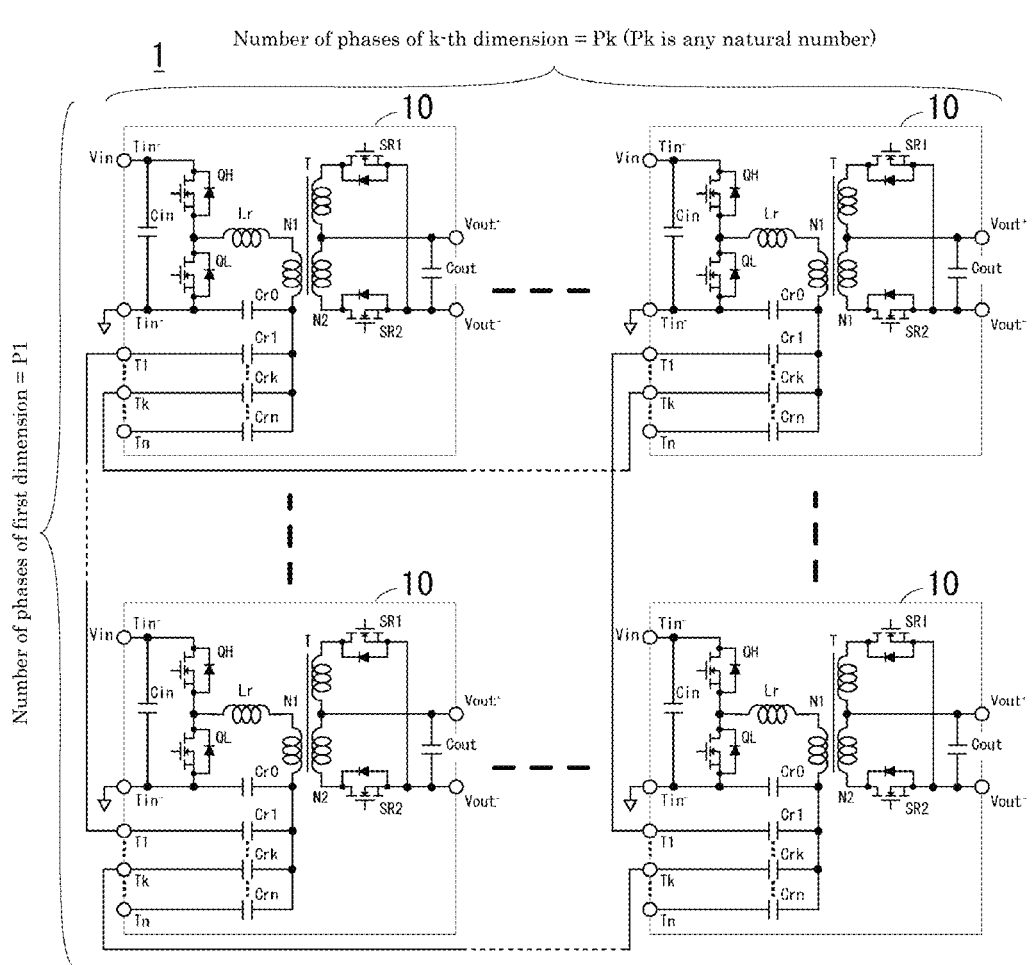
FIG. 1 is a diagram illustrating a circuit configuration of a first embodiment of a switching power supply device.

Hereinafter, an embodiment of the present invention will be described in detail with reference to the drawings. In an embodiment below, the identical reference numeral is given to configurations indicating the same functions, and description of such configurations is appropriately omitted.

First Embodiment

Referring to FIG. 1, a switching power supply device 1 according to the present embodiment includes a plurality of (Σ) half-bridge LLC converters (hereinafter, referred to as circuit elements 10). In the switching power supply device 1, each of one to n dimensions is configured as a multiphase LLC converter. That is, the switching power supply device 1 is a multiphase multiplex LLC converter. Here, n is a natural number of three or more, and the switching power supply device 1 including a multiphase LLC converter of three or more dimensions will be described below.

The circuit element 10 includes a first switch element QH and a second switch element QL connected in series between a high potential input terminal Tin$^+$ connected to a positive electrode of a DC power supply Vin and a low potential input terminal Tin$^-$ connected to a negative electrode of the DC power supply Vin.

The circuit element 10 includes a resonant circuit including a resonant reactor Lr having one end connected to a connection point between the first switch element QH and the second switch element QL, a primary winding N1 of a transformer T, and n+1 resonant capacitors Cr0 to Crn.

The circuit element 10 includes a rectifier smoothing circuit including synchronous rectifying elements SR1 and SR2 that rectify and smooth voltage of a secondary winding N2 of the transformer T and an output capacitor Cout.

In FIG. 1, only a main circuit of the circuit element 10 is illustrated in a solid line frame (corresponding to a module). For the rectifier smoothing circuit, a rectifying system such as center tap rectification, bridge rectification, voltage doubler rectification, and Cockcroft-Walton rectification can be employed.

An input capacitor Cin is connected between the high potential input terminal Tin$^+$ and the low potential input terminal Tin$^-$, and both ends of the output capacitor Cout are connected to a high potential output terminal Vout$^+$ and a low potential output terminal Vout$^-$.

The resonant capacitor Cr0 has one end connected in series to the resonant reactor Lr and the primary winding N1 of the transformer T, and another end connected to the low potential input terminal Tin$^-$.

The resonant capacitors Cr1 to Crn have one ends which are all connected in series to the resonant reactor Lr and the primary winding N1 of the transformer T, and another ends respectively connected to bypass terminals T1 to Tn. Another end (bypass terminal Tk) of a k-th (k is a natural number of one to n) resonant capacitor Crk is connected to another end (bypass terminal Tk) of the k-th resonant capacitor Crk of another one of the circuit elements 10 so that a k-dimensional multiphase LLC converter having a phase difference of 360°/Pk is constructed by Pk (Pk is any natural number) of the circuit elements 10. In the present description, each of n interconnection points of the bypass terminals T1 to Tn is referred to as a k dimension regardless of orthogonality of dimensions.

The total number Σ of the circuit elements 10 is expressed by Formula (1) below by using Pk, which is the number of phases in each of k dimensions.

$$\Sigma = \prod_{k=1}^{n} Pk \qquad (1)$$

Figure 2:
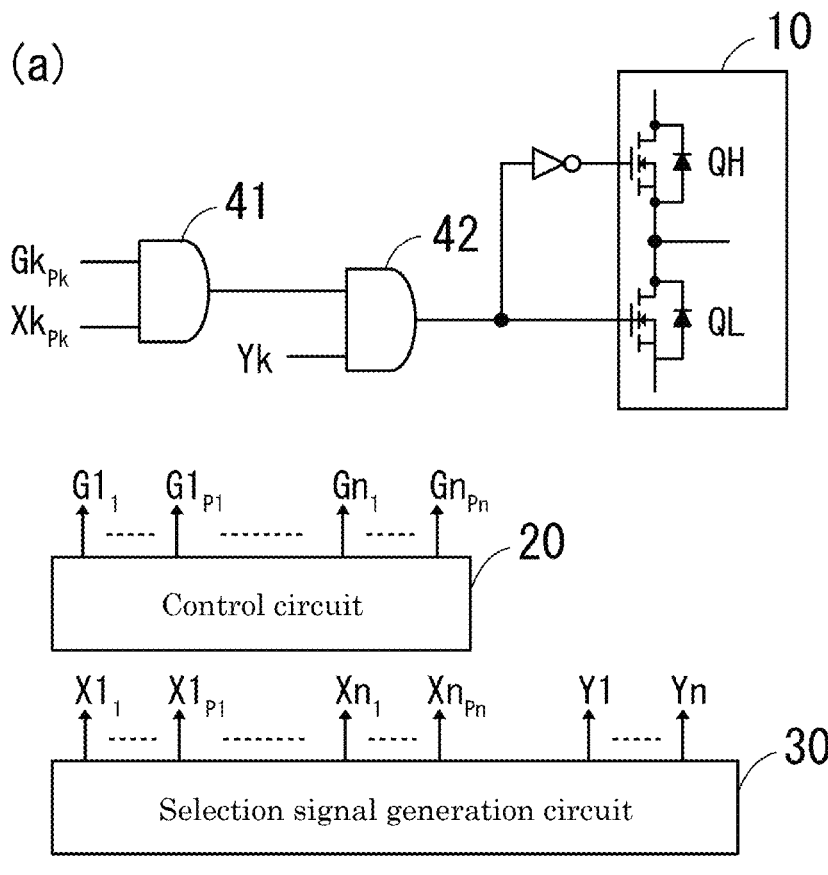
FIG. 2 is a diagram for explaining a circuit for controlling operation of the switching power supply device illustrated in FIG. 1.
Figure 2:
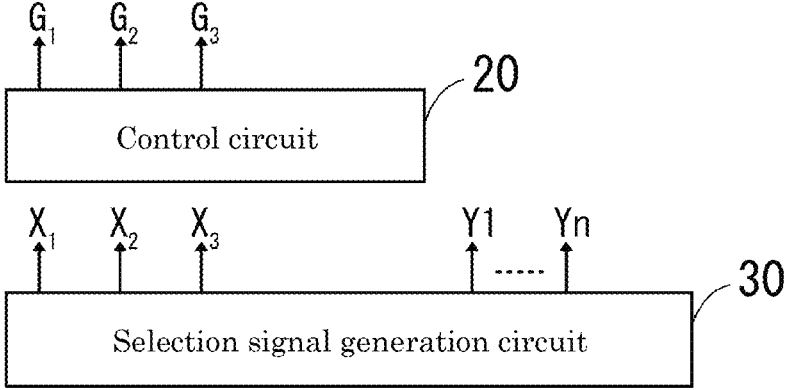

Referring to FIG. 2(*a*), the switching power supply device 1 includes a control circuit 20 and a selection signal generation circuit 30. The control circuit 20 alternately turns on and off the first switch element QH and the second switch element QL of the Σ circuit elements 10 by a complementary gate drive signal Gk$_{Pk(k=1\ to\ n)}$. The selection signal generation circuit 30 controls a dimension selection circuit 42 by a dimension selection signal Yk to select operation and stop of the circuit element 10 for each dimension, and controls a phase selection circuit 41 by the phase selection signal Xk$_{Pk(k=1\ to\ n)}$ to select operation and stop of the Σ circuit elements 10 for each dimension and phase.

The numbers of phases P1 to Pn in one to n dimensions may be different, but are made identical so that the same complementary gate drive signal G$_{Pk}$ can be used in each dimension. By using the same complementary gate drive signal G$_{Pk}$, it is possible to easily perform power expansion by multiple phases without a circuit related to control becoming large in scale. Also when the number of phases Pk is two or a divisor of another number of phases Pk, the complementary gate drive signal G$_{Pk(1\ to\ n)}$ of another dimension can be similarly used.

For example, in a case where the numbers of phases P1 to Pn of one to n dimensions are all set to three, as illustrated in FIG. 2(*b*), the number of complementary gate drive signals generated by the control circuit 20 is three, G$_1$, G$_2$, and G$_3$, and the number of phase selection signals generated by the selection signal generation circuit 30 is also three, X$_1$, X$_2$, and X$_3$.

Figure 3:
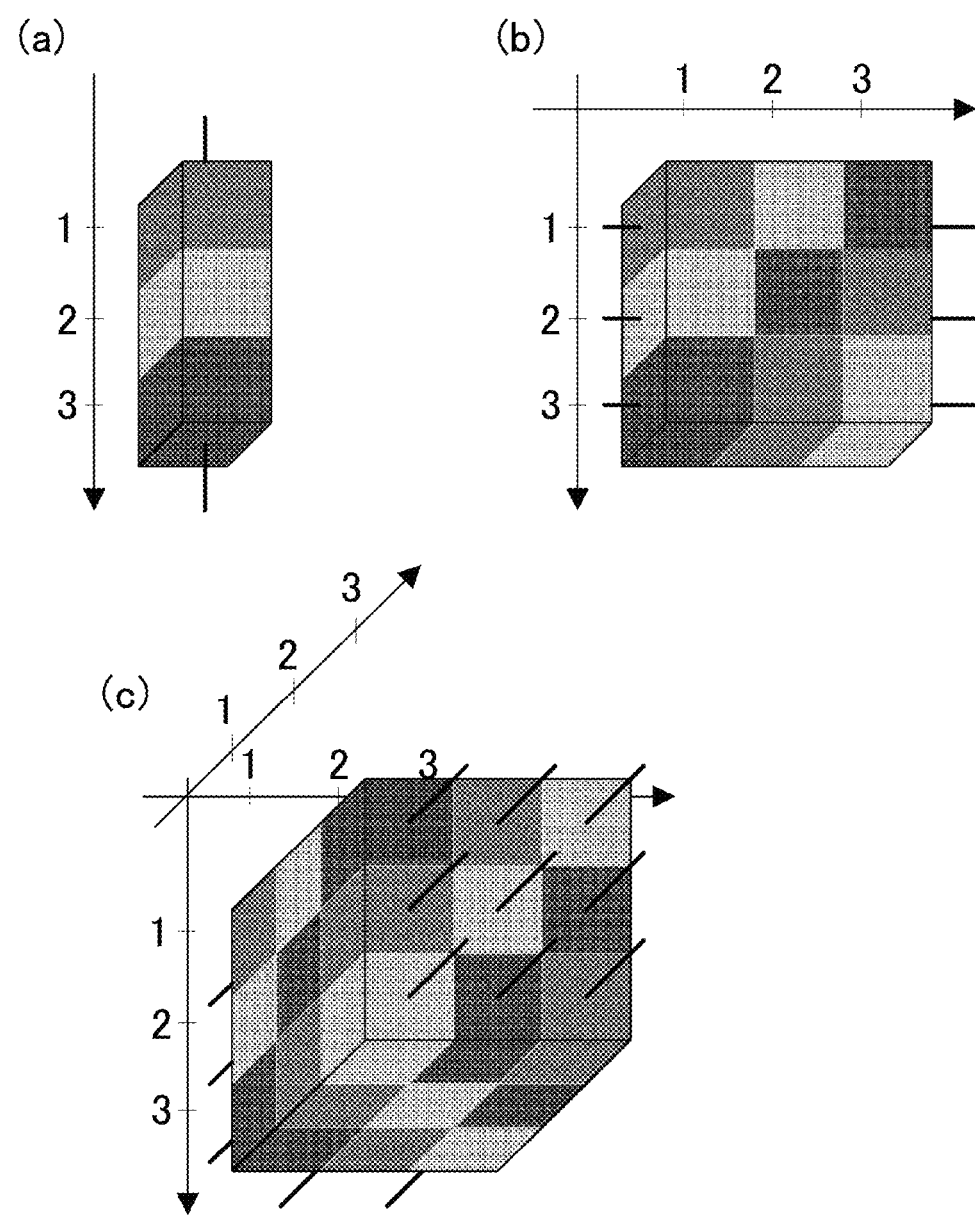
FIG. 3 is a diagram for explaining multidimensionalization (one to three dimensions) of the switching power supply device.

In a one-dimensional three-phase LLC converter including three of the circuit elements 10 including only the resonant capacitor Cr1, a phase is different by 360°/3 in each of the circuit elements 10. In FIG. 3(*a*), the circuit elements 10 are represented by three types of cubes having different concentrations, and a connection point that interconnects another end (the bypass terminal T1) of the resonant capacitor Cr1 is represented by one line penetrating three cubes.

For expansion in a two-dimensional direction, one of the resonant capacitor Cr1 of the circuit element 10 including two of the resonant capacitors Cr1 and Cr2 is connected in a one-dimensional direction, and another one of the resonant capacitor Cr2 is connected in a two-dimensional direction in a manner that phases do not overlap at a connection point. By the above, as illustrated in FIG. 3(*b*), three connection points are added in a two-dimensional direction, and nine of the circuit elements 10 including six interconnection points construct a two-dimensional three-phase three-plex LLC converter. FIG. 3(*b*) illustrates only a connection point in a two-dimensional direction.

Furthermore, for expansion in a three-dimensional direction, two of the resonant capacitors Cr1 and Cr2 of the circuit element 10 having three of the resonant capacitors Cr1, Cr2, and Cr3 are connected in a one-dimensional direction and a two-dimensional direction, respectively, and the third resonant capacitor Cr3 is interconnected in a three-dimensional direction in a manner that phases do not overlap at a connection point. By the above, as illustrated in FIG. 3(*c*), nine interconnection points are added in a three-dimensional direction, and twenty-seven circuit elements 10 including twenty-seven interconnection points construct a three-dimensional three-phase nine-plex LLC converter. FIG. 3(*c*) illustrates only a connection points in a three-dimensional direction.

As described above, the switching power supply device 1 is a multiphase LLC converter at a certain connection point, and when compared between connection points, multiphase LLC converters overlap to form a multiplex LLC converter. Therefore, the switching power supply device of the present embodiment can be referred to as a multiphase multiplex LLC converter.

Figure 4:
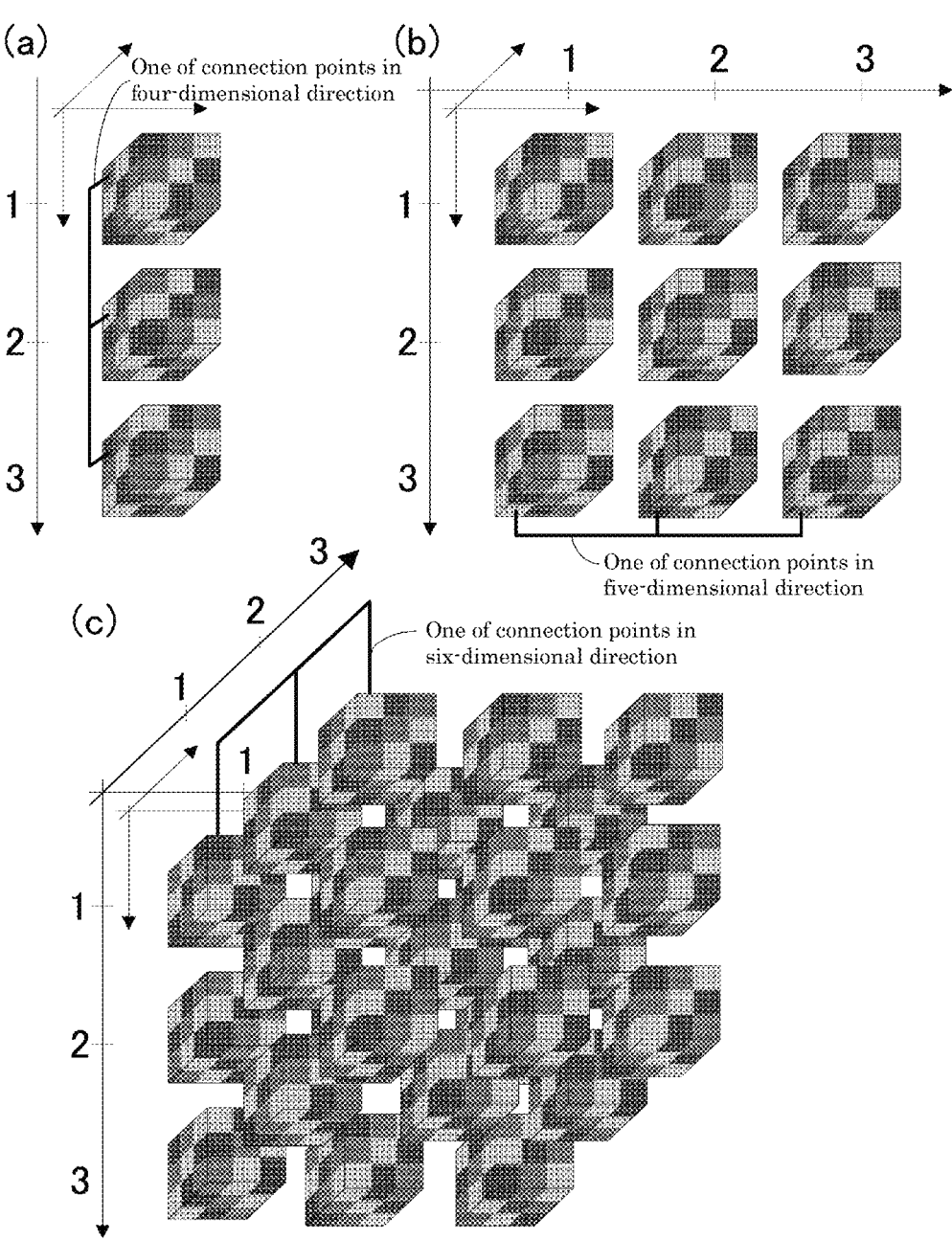
FIG. 4 is a diagram for explaining multidimensionalization (four to six dimensions) of the switching power supply device.

Furthermore, if the three-dimensional three-phase nine-plex LLC converter illustrated in FIG. 3(*b*) is expressed as one cube, as illustrated in FIG. 4(*a*), four dimensions can be recognized similarly as one dimension. For expansion in a four-dimensional direction, three of the resonant capacitors Cr1, Cr2, and Cr3 of the circuit element 10 including four of the resonant capacitors Cr1, Cr2, Cr3, and Cr4 are connected in three dimensions as described above, and the fourth resonant capacitor Cr4 is connected in a four-dimensional direction. By the above, a four-dimensional three-phase twenty-seven-plex LLC converter is constructed by eighty-one in total of the circuit elements 10 including three cubes by which a three-dimensional three-phase nine-plex LLC converter is constructed. As for connection points of four-dimensional three-phase twenty-seven-plex LLC converter, a cube of a three-dimensional three-phase nine-plex LLC converter already contains twenty-seven connection points, and since there are three cubes, there are eighty-one connection points, and twenty-seven connection points are added in a four-dimensional direction, so that one-hundred-eight connection points in total are included. FIG. 4(a) illustrates one of connection points in a four-dimensional direction.

When extended in a five-dimensional direction, as illustrated in FIG. 4(b), two-hundred-forty-three of the circuit elements 10 including four-hundred-five interconnection points construct a five-dimensional three-phase eighty-one-plex LLC converter. FIG. 4(b) illustrates one of connection points in a five-dimensional direction.

Furthermore, when extended in a six-dimensional direction, as illustrated in FIG. 4(c), seven-hundred-twenty-nine of the circuit elements 10 including one-thousand-four-hundred fifty-eight interconnection points construct a six-dimensional three-phase two-hundred-forty-three-plex LLC converter. FIG. 4(c) illustrates one of connection points in a six-dimensional direction.

Figure 5:
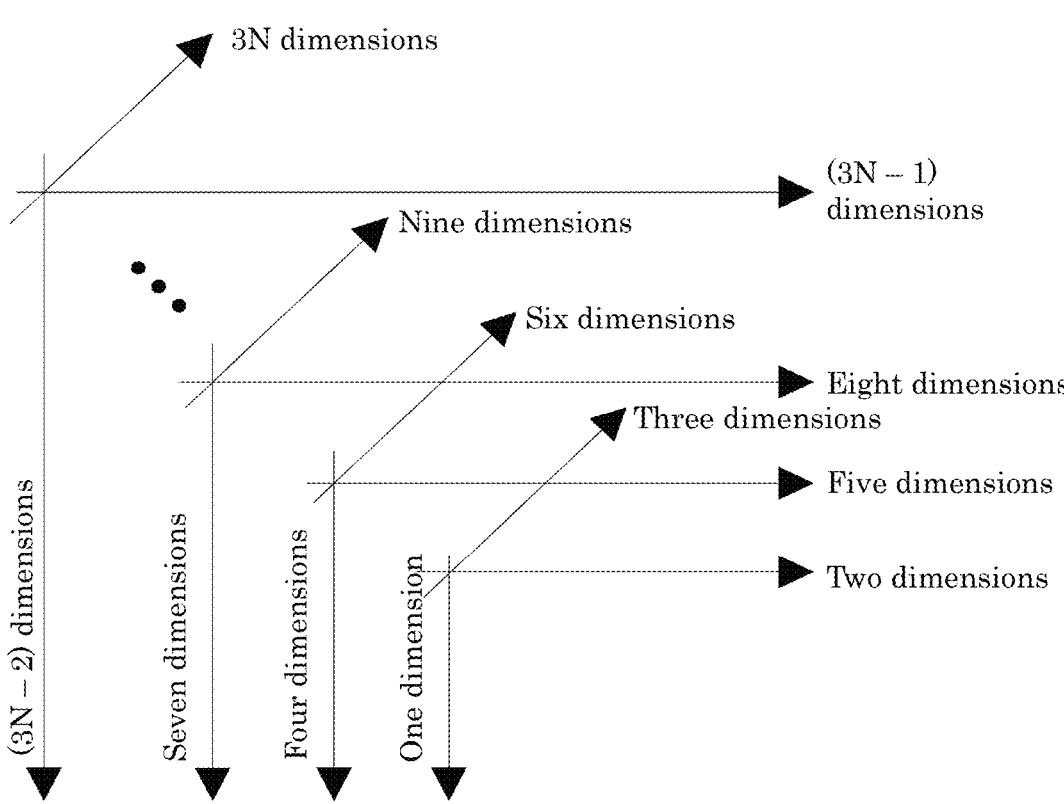
FIG. 5 is a diagram for explaining multidimensionalization of the switching power supply device.

Similarly, a six-dimensional three-phase two-hundred-forty-three-plex LLC converter extended to six dimensions is expressed by one cube, and as illustrated in FIG. 5, the number of circuits can be increased to seven dimensions, eight dimensions, and nine dimensions. Further increase in dimensionality is realized by adding a dimension axis to a multidimensional multiplex LLC converter configured with 3N (N is a natural number) dimensions as one cube. Therefore, when a three-phase LLC converter is made n-dimensional, an n-dimensional three-phase $3^{n-1}$-plex LLC converter is obtained. In this way, it is possible to realize high power without increasing the number of complementary gate drive signals from three phases.

As described above, the switching power supply device 1 has a multidimensional fractal structure obtained by overlapping three-dimensional orthogonal axes. In a case of expansion to three or more dimensions, it is not necessary to set a phase difference to 360°/Σ unlike a conventional multiphase system according to the total number Σ of the circuit elements 10. Since it is not necessary to prepare a complementary gate drive signal generation circuit that generates 2 phase differences, a circuit related to control is prevented to become large in scale. In particular, in a case where the numbers of phases Pk in the dimension are identical, by construction of a multiphase LLC converter having a phase difference of 360°/Pk with respect to a certain connection point, it is possible to increase the number of circuits and increase power while performing current balance by using a circuit that generates Pk complementary gate drive signals.

The switching power supply device 1 according to the present embodiment can be constructed as an integrated circuit (for example, as a power supply IC or a system-on-chip (SoC)) in which a semiconductor and a magnetic component are mixed in a package having limited size. As a simplified example, the switching power supply device 1 having output power of 1 kW (kilowatt) can be realized by connecting ten of the circuit elements 10 that output power of 100 W. A multiphase multiplex converter configured by an integrated circuit may be applied to a Micro Electro Mechanical System (MEMS).

The circuit element 10 of the switching power supply device 1 includes the resonant capacitors Cr1 to Crn divided into n pieces in addition to the resonant capacitor Cr0 having another end connected to the low potential input terminal Tin⁻. Another end (bypass terminal Tk) of the k-th (1 to n) resonant capacitor Crk is connected to another end (bypass terminal Tk) of the k-th resonant capacitor Crk of another one of the circuit elements 10 so that a multiphase LLC converter having a phase difference of 360°/Pk is constructed by Pk of the circuit elements 10. In this case, the total number Σ of the circuit elements 10 included in the switching power supply device 1 is expressed by Formula (1) above, and a total number Σc of interconnection points by the resonant capacitors Cr1 to Crn is expressed by Formula (2) below.

[Mathematical formula 2]

$$\Sigma c = \sum_{k=1}^{n} Pk \cdot \sum_{k=1}^{n} Pk^{-1} \tag{2}$$

A resonance frequency ωr when all Σ of the circuit elements 10 of the switching power supply device 1 operate is expressed by Formula (3) below.

[Mathematical formula 3]

$$\omega r = \frac{1}{\sqrt{Lr \sum_{k=0}^{n} Cr_k}} \tag{3}$$

The resonance frequency ωr in a case where capacities of the resonant capacitors Cr0 to Crn are equal is expressed by Formula (4) below.

[Mathematical formula 4]

$$\omega r = \frac{1}{\sqrt{Lr \sum_{k=0}^{n} Cr_k}} = \frac{1}{\sqrt{Lr \frac{Cr}{n+1} \cdot (n+1)}} = \frac{1}{\sqrt{LrCr}} \tag{4}$$

That the total number Σ of the circuit elements 10 and interconnection points coincide with each other is a condition expressed by Formula (5) below from Formulas (1) and (2).

[Mathematical formula 5]

$$\sum_{k=1}^{n} Pk^{-1} \leqq 1 \tag{5}$$

In particular, when the circuit element 10 is modularized as illustrated in FIG. 1, the total number Σ of the circuit elements 10 and connection points can be limited to 1:1.

Figure 6:
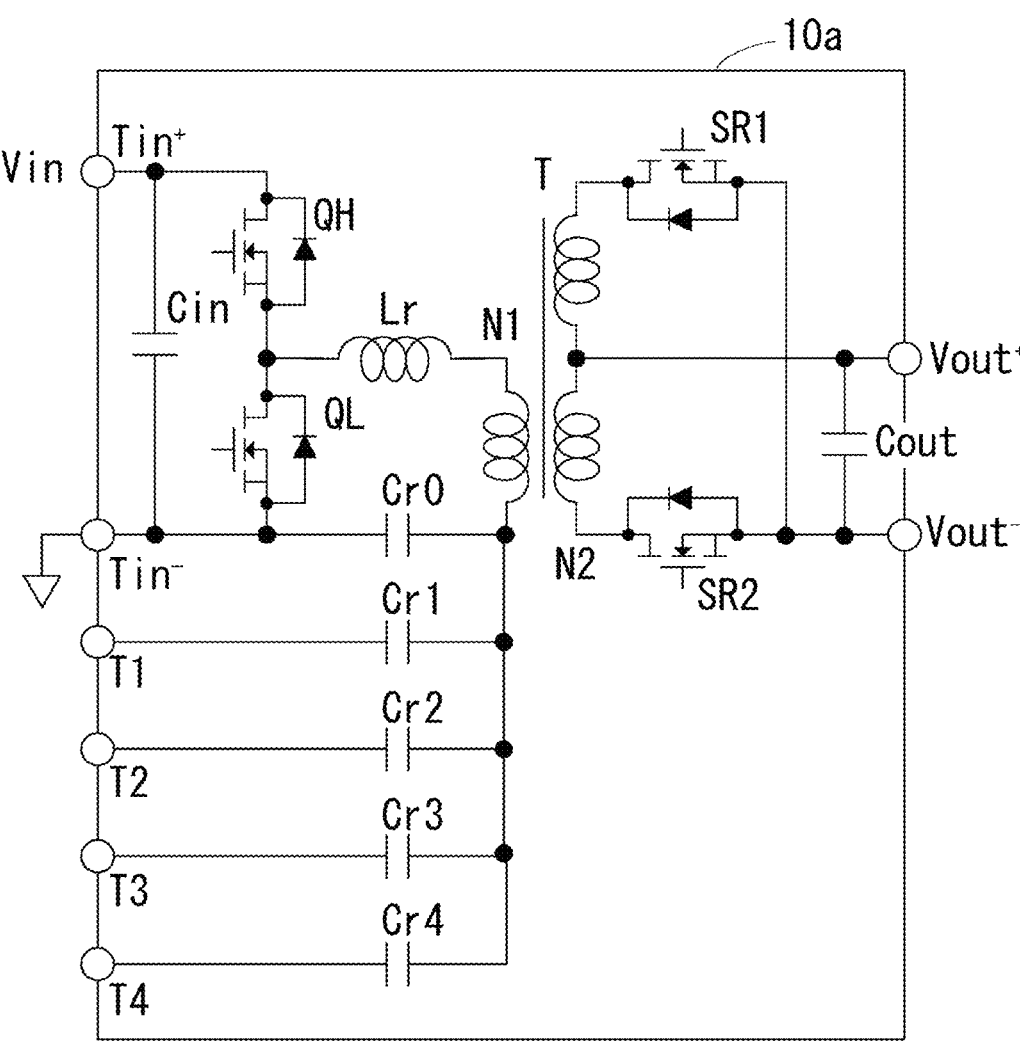
FIG. 6 is a diagram illustrating a configuration of a circuit element modularized on the assumption of expansion to four dimensions.

A circuit element 10a illustrated in FIG. 6 is modularized on the assumption of expansion to up to four dimensions, and includes four of the resonant capacitors Cr1 to Cr4 in addition to the resonant capacitor Cr0. In a case of not expanding to four dimensions, as for connection points (the bypass terminals T1 to T4) of the four resonant capacitors Cr1 to Cr4, a connection point to be connected may be shared or connection may be established to a power supply line. In FIG. 6, only a main circuit of the circuit element 10*a* is illustrated in a solid line frame (corresponding to a module). By providing the input capacitor Cin and the output capacitor Cout as a smoothing capacitor, input and output ripple current in the modularized circuit element 10*a* is compensated. Therefore, allowable ripple current of a smoothing capacitor (the input capacitor Cin and the output capacitor Cout) is not exceeded when a large number of modules are connected.

Figure 7:
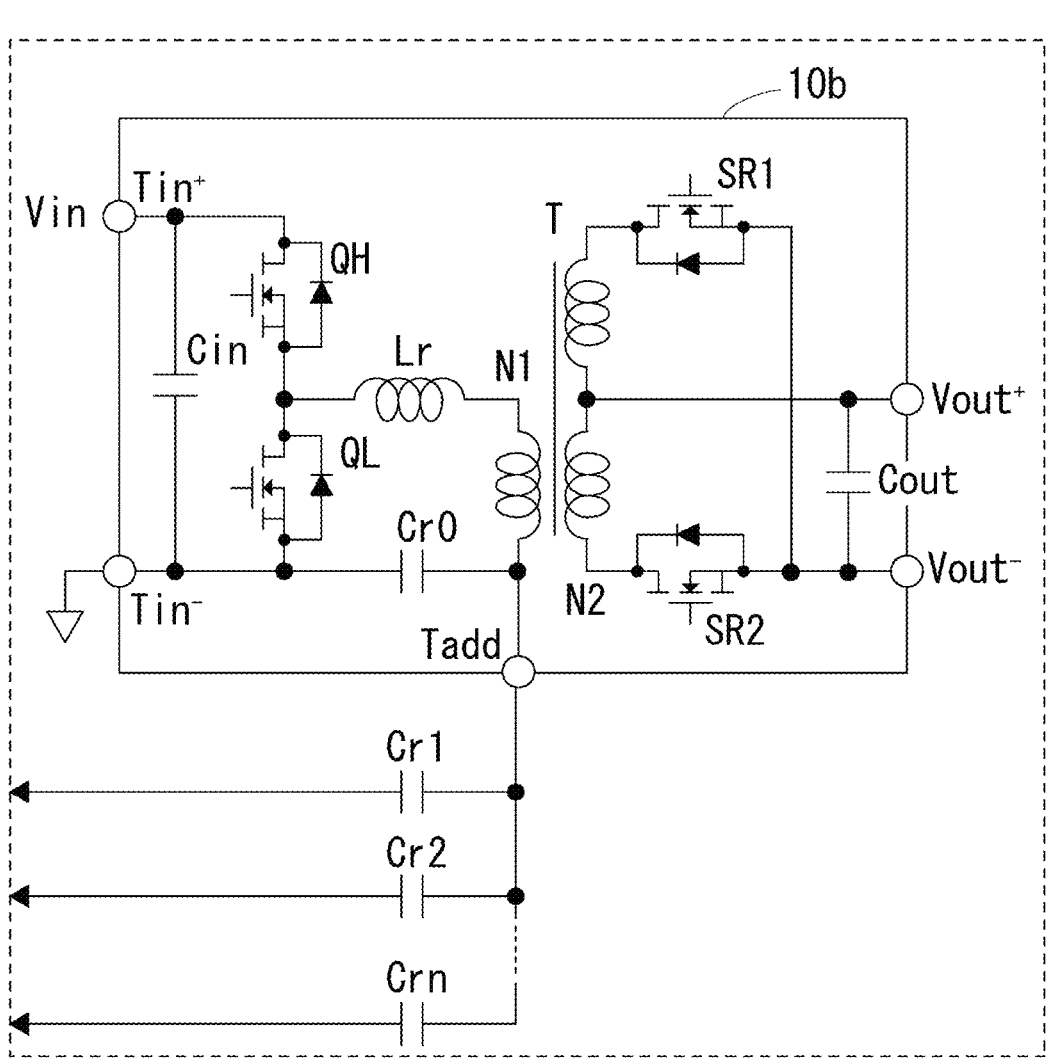
FIG. 7 is a diagram illustrating a configuration of a circuit element modularized on the assumption of expansion to n dimensions.

A circuit element 10*b* illustrated in FIG. 7 is modularized, including a resonant capacitor additional terminal Tadd for dimension expansion to which n of the resonant capacitors Cr1 to Crn can be connected. That is, the circuit element 10*b* is modularized, incorporating only the resonant capacitor Cr0, and includes the resonant capacitor additional terminal Tadd connected to a connection point between the primary winding N1 of the transformer T and one end of the resonant capacitor Cr0. By the resonant capacitor additional terminal Tadd, n of the resonant capacitors Cr1 to Crn can be externally attached on another substrate such as a mother-board indicated by a dotted line frame. In FIG. 7, only a main circuit of the circuit element 10*b* is illustrated in a solid line frame (module).

Figure 8:
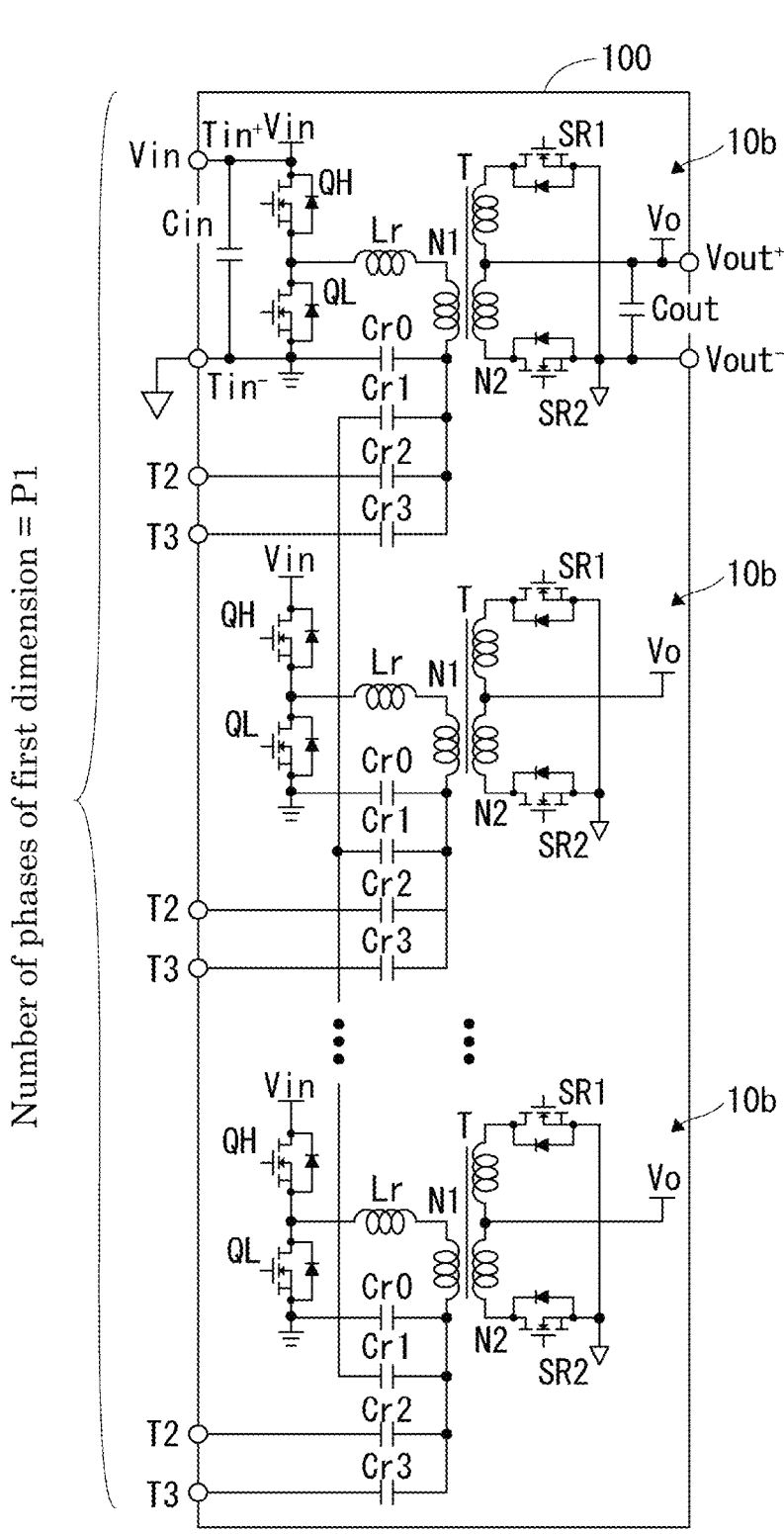
FIG. 8 is a diagram illustrating a configuration of a circuit element modularized in one dimension.

A one-dimensional Pk-phase LLC converter 100 illustrated in FIG. 8 is modularized by one-dimensionally connecting the circuit element 10*b* including three of the resonant capacitors Cr1 to Cr3 in addition to the resonant capacitor Cr0 in view of expansion to three dimensions. Each of the circuit elements 10*b* has connection points (bypass terminals T2 to T3) of two of the resonant capacitors Cr2 to Cr3, and can expand in a two-dimensional direction and a three-dimensional direction. In the one-dimensional Pk-phase LLC converter 100, a smoothing capacitor (the input capacitor Cin and the output capacitor Cout) is provided at input and output for the purpose of reducing ripple current. By providing the smoothing capacitor at input and output, stability of input and output voltage can be guaranteed when modules are connected in series and parallel.

By controlling the phase selection circuit 41 and the dimension selection circuit 42 illustrated in FIG. 2 by the phase selection signal $Xk_{Pk(k=1\ to\ n)}$ and the dimension selection signal Yk, the switching power supply device 1 can control operation and stop of the circuit element 10 in units of phase and dimension to switch the number of the circuit elements 10 to be operated.

Figure 9:
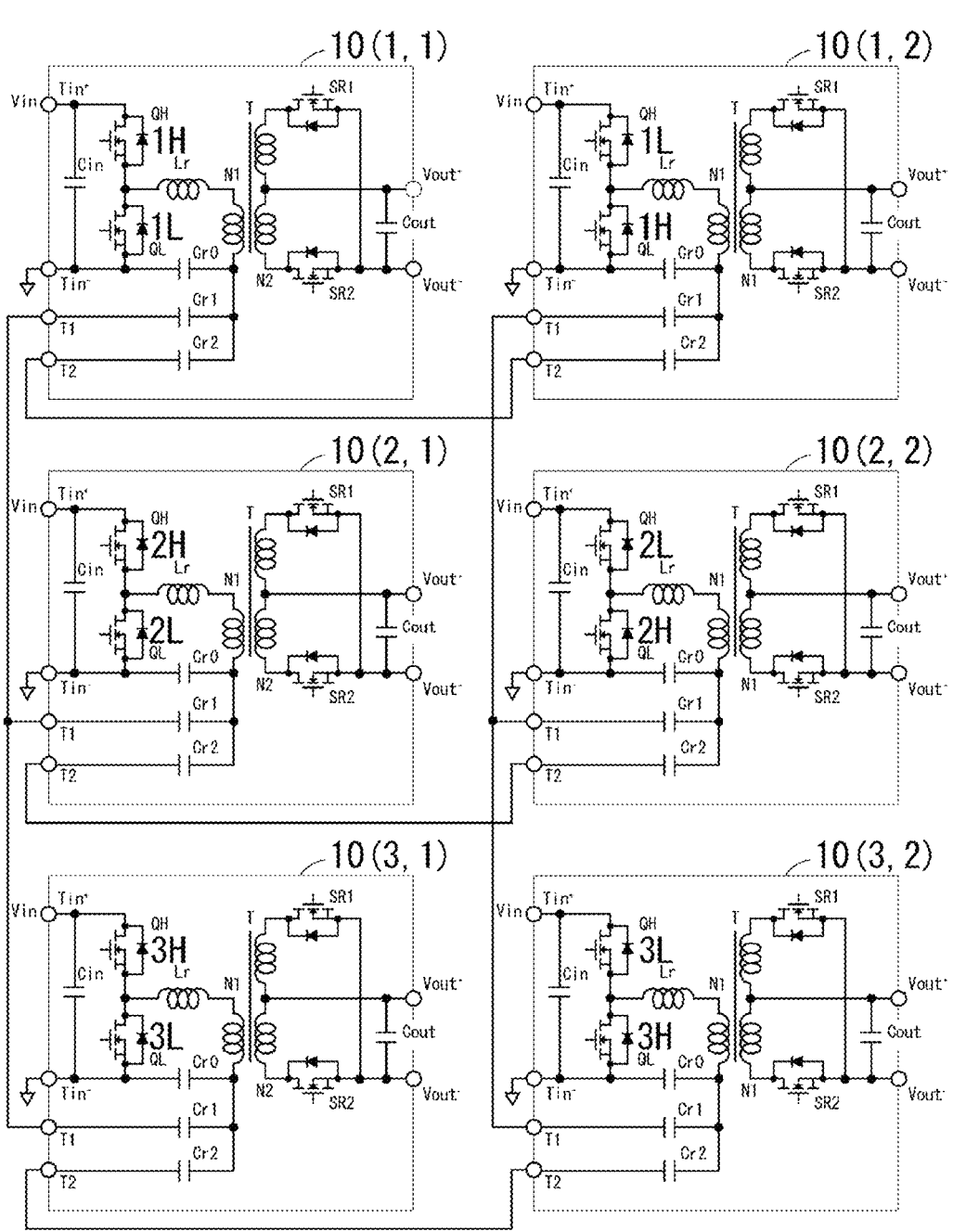
FIG. 9 is a diagram illustrating an example of a multiphase multiplex converter including six circuit elements 10.

For the sake of simplicity, switching of the number of circuits will be described exemplifying a multiphase multiplex converter including six of the circuit elements 10 illustrated in FIG. 9, by which a three-phase LLC converter in a one-dimensional direction and a two-phase LLC converter in a two-dimensional direction are constructed. In FIG. 9, as to (x, y) attached to each of the circuit elements 10, x indicates a phase in a one-dimensional direction, and y indicates a phase in a two-dimensional direction. That is, x=1 indicates phase of zero, x=2 indicates a phase of 360°/3=120°, x=3 indicates a phase of 2×360°/3=240°, y=1 indicates a phase of zero, and y=2 indicates a phase of 360°/2=180°.

Figure 10:
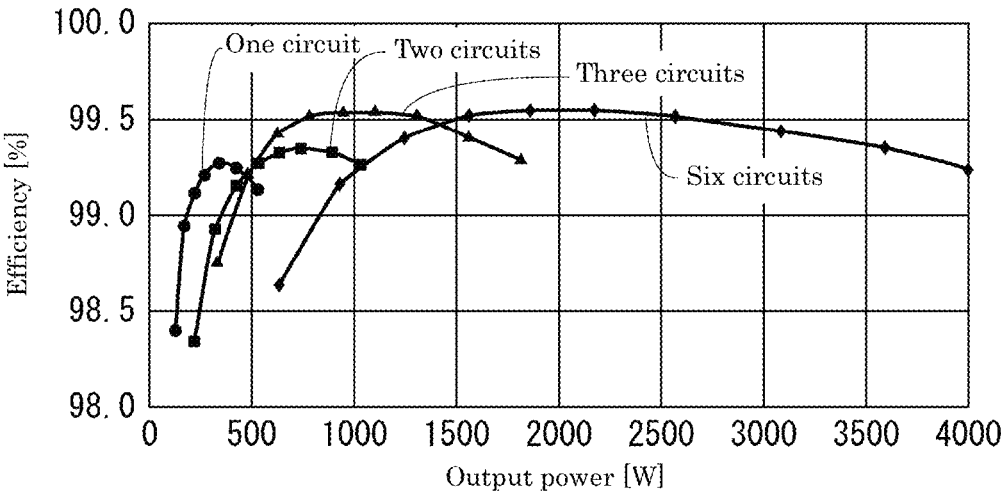
FIG. 10 is an efficiency graph for explaining operation of the multiphase multiplex converter illustrated in FIG. 9.

FIG. 10 illustrates an efficiency graph when only elements (1, 1) and (1, 2) are operated at the time of light loading (when output power is small), only elements (1, 1), (2, 1), and (3, 1) are operated as a load increases, and six circuit elements are operated at the time of heavy loading.

Capacities of the resonant capacitors Cr0, Cr1, and Cr2 of each of the circuit elements 10 are set as αCr, βCr, and γCr, respectively, and are set as in Formula (6) below.

[Mathematical formula 6]

$$\alpha + \beta + \gamma = 1 \tag{6}$$

In this case, the resonance frequency ωr when all six of the circuit elements 10 are operating is expressed by Formula (7) below.

[Mathematical formula 7]

$$\omega r = \frac{1}{\sqrt{Lr \cdot (\alpha + \beta + \gamma)Cr}} = \frac{1}{\sqrt{LrCr}} \tag{7}$$

A resonance frequency ωr, 1φ in a case where only the circuit element (1, 1) operates is expressed by Formula (8) below by combined capacity Cr, 1φ with capacity of a resonant capacitor circuit network of the circuit element 10 that is not operating.

[Mathematical formula 8]

$$\omega_{r.1\phi} = \frac{1}{\sqrt{LrCr_{1\phi}}} = \omega r \sqrt{\frac{(1+\alpha)\{3\alpha + \beta(1 - \alpha - \beta)\} - \alpha\beta(\alpha + \beta)}{6\alpha(1-\beta)(\alpha + \beta)}} \tag{8}$$

Similarly, a resonance frequency ωr, 2φ when only two half-bridge LLC circuit elements operate in a two-dimensional direction like the circuit elements (1, 1) and (1, 2) is expressed by Formula (9) below.

[Mathematical formula 9]

$$\omega_{r.2\phi} = \frac{1}{\sqrt{LrCr_{2\phi}}} = \omega r \sqrt{\frac{3 - 2\beta}{3(1 - \beta)}} \tag{9}$$

Similarly, a resonance frequency ωr, 3φ when only three half-bridge LLC circuit elements operate in a one-dimensional direction like the circuit elements (1, 1), (2, 1), and (3, 1) is expressed by Formula (10) below.

[Mathematical formula 10]

$$\omega_{r.3\phi} = \frac{1}{\sqrt{LrCr_{3\phi}}} = \omega r \sqrt{\frac{1 + \alpha + \beta}{2(1 + \beta)}} \tag{10}$$

When α=β=γ=⅓, with respect to a resonance frequency at the time of six circuit operation, a resonance frequency at the time of one circuit operation increases by 25.8%, at the time of two circuit operation increases by 8%, and at the time of three circuit operation increases by 11.8%. An actual switching frequency is almost the same.

As described above, by switching operation and stop of the multidimensional circuit elements 10 instead of simply switching the number of operation phases of multiple phases, efficiency can be maintained according to a load.

As described above, according to the present embodiment, a plurality of (Σ) half-bridge LLC converters including the first switch element QH and the second switch element QL connected in series to both ends of the DC power supply Vin, and a resonant circuit including the resonant reactor Lr having one end connected to a connection point between the first switch element QH and the second switch element QL, the primary winding N1 of the transformer T, and n+1 (n is a natural number of three or more) of a zeroth order resonant capacitor (resonant capacitors Cr0) to a n-th order resonant capacitor (resonant capacitors Crn) are included as the circuit elements 10. The zeroth order resonant capacitor of each of the circuit elements 10 has one end connected in series to the resonant reactor Lr, the primary winding N1 of the transformer T, and another end connected to a power supply line, and a k-th order resonant capacitor (resonant capacitor Crk, k is a natural number of one to n) of each circuit element has one end connected in series to the resonant reactor Lr and the primary winding N1 of the transformer T, and another end connected to a k-th order resonant capacitor of another one of the circuit elements 10 so that a k-th dimensional multiphase LLC converter having a phase difference of 360°/Pk is constructed by Pk (Pk is any natural number) of the circuit elements 10.

With this configuration, the number of complementary gate drive signals can be made smaller than the total number Σ of the circuit elements 10, and high power can be realized without increasing complementary gate drive signals.

According to the present embodiment, the total number Σ of the circuit elements 10 is a product of the numbers of phases included in the dimensions (Σ=P1×P2×, . . . , ×Pn).

With this configuration, by increasing the number of dimensions, the total number Σ of the circuit elements 10 can be exponentially increased, and it is possible to cope with increase in power.

If the numbers of phases Pk in one to n dimensions are set to be identical, the same complementary gate drive signal $G_{Pk\,(1\,to\,n)}$ can be used in each dimension, and power expansion can be easily performed by multiple phases without making a circuit related to control large in scale.

According to the present embodiment, the dimension selection circuit 42 that selects operation and stop of the circuit element 10 in units of dimension, and the selection signal generation circuit 30 that generates the dimension selection signal Yk that controls the dimension selection circuit 42 are included.

With this configuration, it is possible to maintain efficiency by switching the number of operation circuits according to a load. Furthermore, by using the phase selection circuit 41 that selects operation and stop of the circuit element 10 in units of phase, it is possible to maintain efficiency in a wide range from light loading in which only one of the circuit elements 10 is operated to heavy loading in which all the circuit elements 10 are operated.

Second Embodiment

In JP 6696617 B2 described above, a resonant capacitor having one end connected in series to a resonant reactor and a primary winding of a transformer and another end connected to the ground (negative electrode of a DC power supply) is included, so that current balance between phases is achieved. When a distances between a plurality of LLC converters is long, potentials of the ground may be different.

In such a case, since connection point voltages of resonant capacitors connected to the ground are different, it is difficult to balance current.

The present embodiment provides a switching power supply device in which the total number of LLC converters can be increased without increasing a complementary gate drive signals, and high power can be achieved by balancing current between the LLC converters.

A switching power supply device according to the present embodiment includes, as circuit elements, a plurality of half-bridge LLC converters including a first switch element and a second switch element connected in series between a positive electrode and a negative electrode of a DC power supply, and a resonant circuit including a resonant reactor having one end connected to a connection point between the first switch element and the second switch element, a primary winding of a transformer, and n (n is a natural number of two or more) of a first order resonant capacitor to an n-th order resonant capacitor. In the switching power supply device, a k-th order resonant capacitor (k is a natural number of one to n) of each circuit element has one end connected to the resonant reactor and a primary winding of the transformer in series without being connected to the negative electrode (power supply line) via a capacitor, and has another end connected to the k-th order resonant capacitor of another circuit element so that a k-dimensional multiphase LLC converter having a phase difference of 360°/Pk is constructed by Pk (Pk is any natural number) circuit elements.

According to the present embodiment, the number of complementary gate drive signals can be made smaller than the total number of circuit elements, and the number of complementary gate drive signals is not increased. Further, since a resonant capacitor connected to a negative electrode of a DC power supply is omitted, it is easy to balance current between LLC converters. In the present embodiment, the total number of LLC converters can be increased, and high power can be increased by balancing current between the LLC converters.

Figure 11:
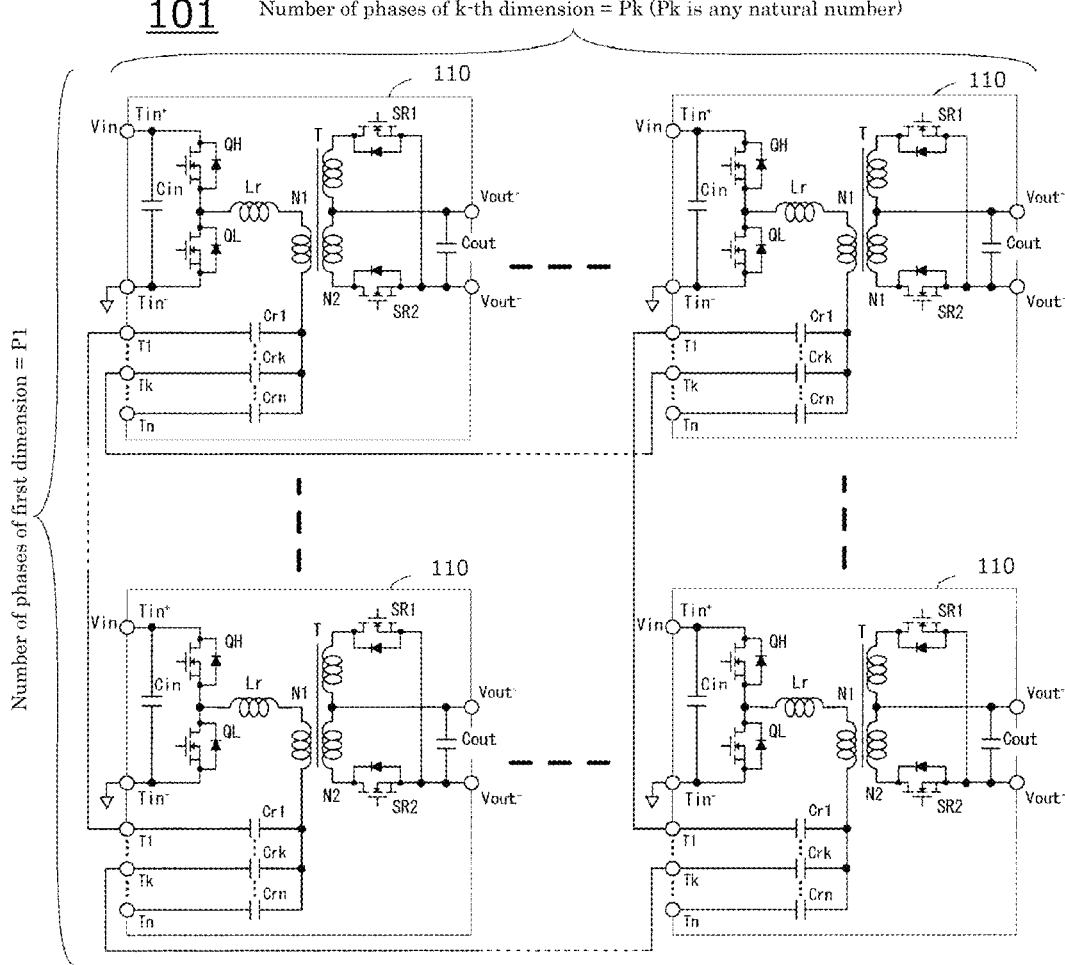
FIG. 11 is a diagram illustrating a circuit configuration of a second embodiment of the switching power supply device.

Referring to FIG. 11, a switching power supply device 101 according to the present embodiment includes a plurality of (Σ) half-bridge LLC converters (hereinafter, referred to as circuit elements 110). In the switching power supply device 101, each of one to n dimensions is configured as a multiphase LLC converter. That is, the switching power supply device 101 is a multiphase multiplex LLC converter. Here, n is a natural number of two or more, and the switching power supply device 101 including a multiphase LLC converter of two or more dimensions will be described below.

The circuit element 110 includes the first switch element QH and the second switch element QL connected in series between the high potential input terminal Tin⁺ connected to a positive electrode of the DC power supply Vin and the low potential input terminal Tin⁻ connected to a negative electrode of the DC power supply Vin.

The circuit element 110 includes a resonant circuit including a resonant reactor Lr having one end connected to a connection point between the first switch element QH and the second switch element QL, a primary winding N1 of a transformer T, and the n resonant capacitors Cr1 to Crn.

The circuit element 110 includes a rectifier smoothing circuit including the synchronous rectifying elements SR1 and SR2 that rectify and smooth voltage of the secondary winding N2 of the transformer T and the output capacitor Cout.

In FIG. 11, only a main circuit of the circuit element 110 is illustrated in a solid line frame (corresponding to a module). For the rectifier smoothing circuit, a rectifying system such as center tap rectification, bridge rectification, voltage doubler rectification, and Cockcroft-Walton rectification can be employed.

An input capacitor Cin is connected between the high potential input terminal Tin$^+$ and the low potential input terminal Tin$^-$, and both ends of the output capacitor Cout are connected to a high potential output terminal Vout$^+$ and a low potential output terminal Vout$^-$.

The resonant capacitors Cr1 to Crn have one ends which are all connected in series to the resonant reactor Lr and the primary winding N1 of the transformer T, and another ends respectively connected to bypass terminals T1 to Tn. Another end (the bypass terminal Tk) of the k-th (k is a natural number of one to n) resonant capacitor Crk is connected to another end (the bypass terminal Tk) of the k-th resonant capacitor Crk of another one of the circuit elements 110 so that a k-dimensional multiphase LLC converter having a phase difference of 360°/Pk is constructed by Pk (Pk is any natural number) of the circuit elements 110.

One ends of the resonant capacitors Cr1 to Crn connected in series to the resonant reactor Lr and the primary winding N1 of the transformer T are not connected to a negative electrode (the low potential input terminal Tin) of the DC power supply Vin via a capacitor. In other words, the primary winding N1 of the transformer T and a negative electrode of the DC power supply Vin are not connected via a resonant capacitor. Other configurations in the present embodiment are similar to those in the first embodiment.

That is, the total number Σ of the circuit elements 110 is expressed by Formula (1) above by using Pk, which is the number of phases in k dimensions.

The switching power supply device 101 includes the control circuit 20 and the selection signal generation circuit 30 illustrated in FIGS. 2(*a*) and 2(*b*).

In a one-dimensional three-phase LLC converter including three of the circuit elements 110 including only the resonant capacitor Cr1, a phase is different by 360°/3 in each of the circuit elements 110. Expansion in a two-dimensional direction and expansion in a three-dimensional direction are illustrated in FIGS. 3(*a*) to 3(*c*). Expansion in four to six dimensional directions is illustrated in FIGS. 4(*a*) to 4(*c*). Expansion in seven to nine dimensional directions is illustrated in FIG. 5. High power can be achieved without increasing the number of complementary gate drive signals from three phases.

As described above, the switching power supply device 101 has a multidimensional fractal structure obtained by overlapping three-dimensional orthogonal axes. In a case of expansion to three or more dimensions, it is not necessary to set a phase difference to 360°/Σ unlike a conventional multiphase system according to the total number Σ of the circuit elements 110. Since it is not necessary to prepare a complementary gate drive signal generation circuit that generates Σ phase differences, a circuit related to control is prevented to become large in scale. In particular, in a case where the numbers of phases Pk in the dimension are identical, by construction of a multiphase LLC converter having a phase difference of 360°/Pk with respect to a certain connection point, it is possible to increase the number of circuits and increase power while performing current balance by using a circuit that generates Pk complementary gate drive signals.

The switching power supply device 101 according to the present embodiment can be constructed as an integrated circuit (for example, as a power supply IC or a system-on-chip (SoC)) in which a semiconductor and a magnetic component are mixed in a package having limited size. As a simplified example, the switching power supply device 101 having output power of 1 kW (kilowatt) can be realized by connecting ten of the circuit elements 110 that output power of 100 W. A multi-phase multiplex converter configured by an integrated circuit may be applied to a Micro Electro Mechanical System (MEMS).

The circuit element 110 of the switching power supply device 101 includes the resonant capacitors Cr1 to Crn divided into n pieces. Another end (bypass terminal Tk) of the k-th (1 to n) resonant capacitor Crk is connected to another end (bypass terminal Tk) of the k-th resonant capacitor Crk of another one of the circuit elements 110 so that a multiphase LLC converter having a phase difference of 360°/Pk is constructed by Pk of the circuit elements 110. In this case, the total number Σ of the circuit elements 110 including the switching power supply device 101 is expressed by Formula (1) above, and the total number Σc of interconnection points by the resonant capacitors Cr1 to Crn is expressed by Formula (2) above.

The resonance frequency ωr when all Σ of the circuit elements 110 of the switching power supply device 101 operate is expressed by Formula (11) below.

[Mathematical formula 11]

$$\omega r = \frac{1}{\sqrt{Lr \displaystyle\sum_{k=1}^{n} Cr_i}} \qquad (11)$$

The resonance frequency ωr in a case where capacities of the resonant capacitors Cr1 to Crn are equal is expressed by Formula (12) below.

[Mathematical formula 12]

$$\omega r = \frac{1}{\sqrt{Lr \displaystyle\sum_{k=1}^{n} Cr_k}} = \frac{1}{\sqrt{Lr \frac{Cr}{n} \cdot n}} = \frac{1}{\sqrt{LrCr}} \qquad (12)$$

That the total number Σ of the circuit elements 110 and interconnection points coincide with each other is a condition expressed by Formula (5) above.

In particular, when the circuit element 110 is modularized as illustrated in FIG. 11, the total number Σ of the circuit elements 110 and connection points can be limited to 1:1.

Figure 12:
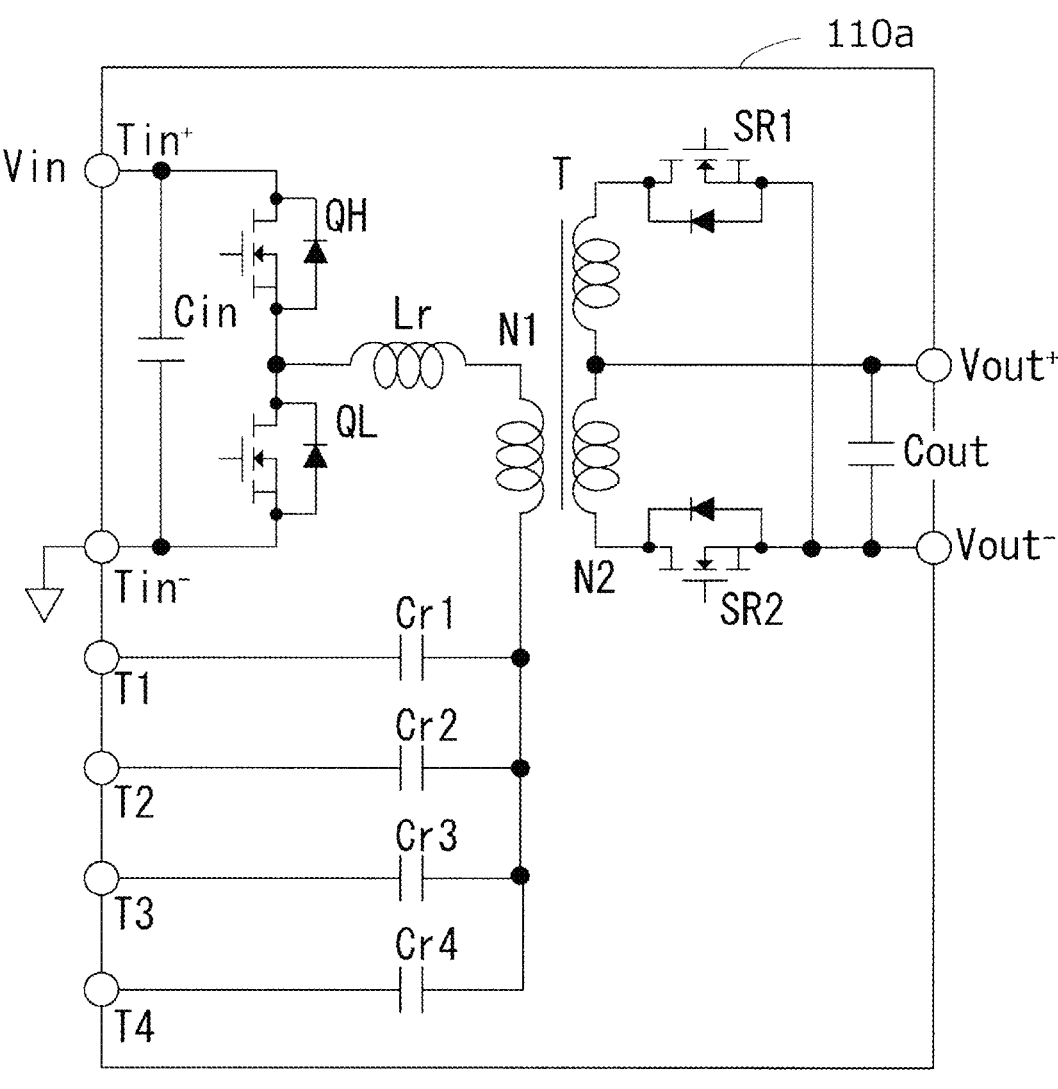
FIG. 12 is a diagram illustrating a configuration of a circuit element modularized on the assumption of expansion to four dimensions.

A circuit element 110*a* illustrated in FIG. 12 is modularized on the assumption of expansion to up to four dimensions, and includes four of the resonant capacitors Cr1 to Cr4. In a case of not expanding to four dimensions, as for connection points (the bypass terminals T1 to T4) of the four resonant capacitors Cr1 to Cr4, a connection point to be connected may be shared or connection may be established to a power supply line. In FIG. 12, only a main circuit of the circuit element 110*a* is illustrated in a solid line frame (corresponding to a module). By providing the input capacitor Cin and the output capacitor Cout as a smoothing capacitor, input and output ripple current in the modularized circuit element 110*a* is compensated. Therefore, allowable ripple current of a smoothing capacitor (the input capacitor Cin and the output capacitor Cout) is not exceeded when a large number of modules are connected.

Figure 13:
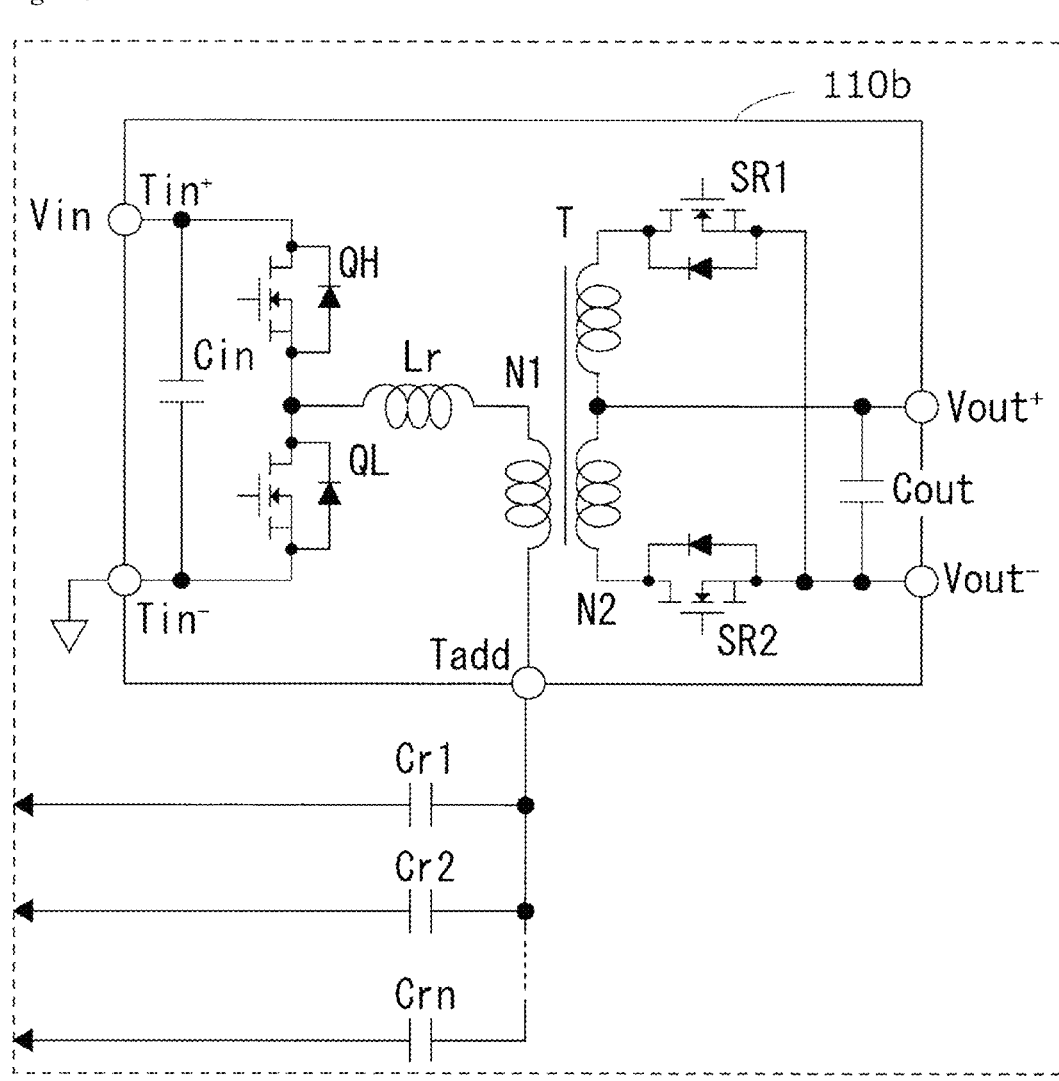
FIG. 13 is a diagram illustrating a configuration of a circuit element modularized on the assumption of expansion to n dimensions.

A circuit element 110*b* illustrated in FIG. 13 is modularized, including the resonant capacitor additional terminal Tadd for dimension expansion to which n of the resonant capacitors Cr1 to Crn can be connected. That is, the circuit element 110*b* has a modularized configuration excluding the resonant capacitors Cr1 to Crn, and includes the resonant capacitor additional terminal Tadd connected to the primary winding N1 of the transformer T. By the resonant capacitor additional terminal Tadd, n of the resonant capacitors Cr1 to Crn can be externally attached on another substrate such as a motherboard indicated by a dotted line frame. In FIG. 13, only a main circuit of the circuit element 110*b* is illustrated in a solid line frame (corresponding to a module).

Figure 14:
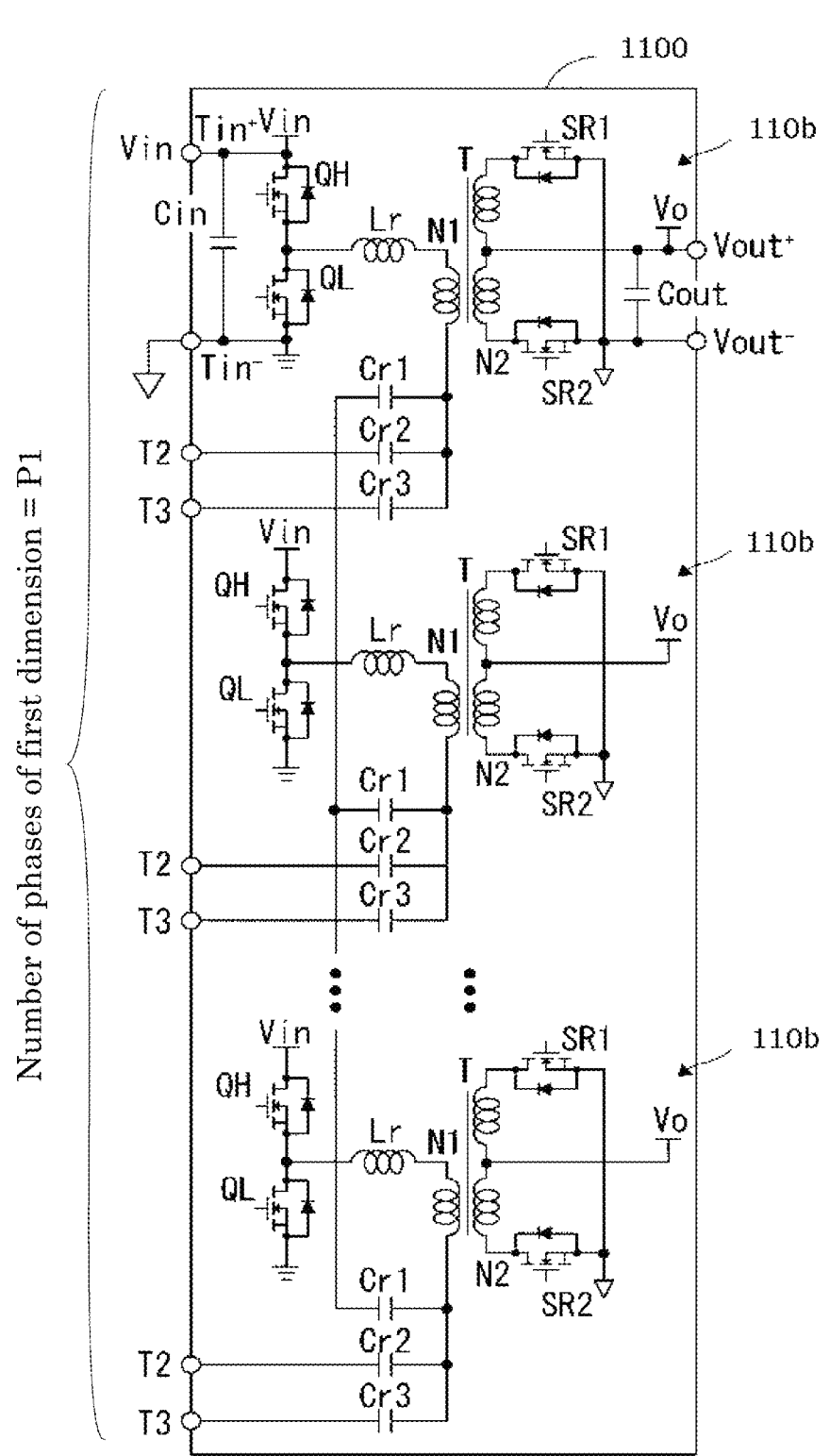
FIG. 14 is a diagram illustrating a configuration of a circuit element modularized in one dimension.

A one-dimensional Pk-phase LLC converter 1100 illustrated in FIG. 14 is modularized by one-dimensionally connecting the circuit element 110*b* including three of the resonant capacitors Cr1 to Cr3. Each of the circuit elements 110*b* has connection points (the bypass terminals T2 to T3) of two of the resonant capacitors Cr2 to Cr3, and can expand in a two-dimensional direction and a three-dimensional direction. In the one-dimensional Pk-phase LLC converter 1100, a smoothing capacitor (the input capacitor Cin and the output capacitor Cout) is provided at input and output for the purpose of reducing ripple current. By providing the smoothing capacitor at input and output, stability of input and output voltage can be guaranteed when modules are connected in series and parallel.

By controlling the phase selection circuit 41 and the dimension selection circuit 42 illustrated in FIG. 2 by the phase selection signal Xk$_{Pk(k=1\ to\ n)}$ and the dimension selection signal Yk, the switching power supply device 101 can control operation and stop of the circuit element 110 in units of phase and dimension to switch the number of the circuit elements 10 to be operated.

Figure 15:
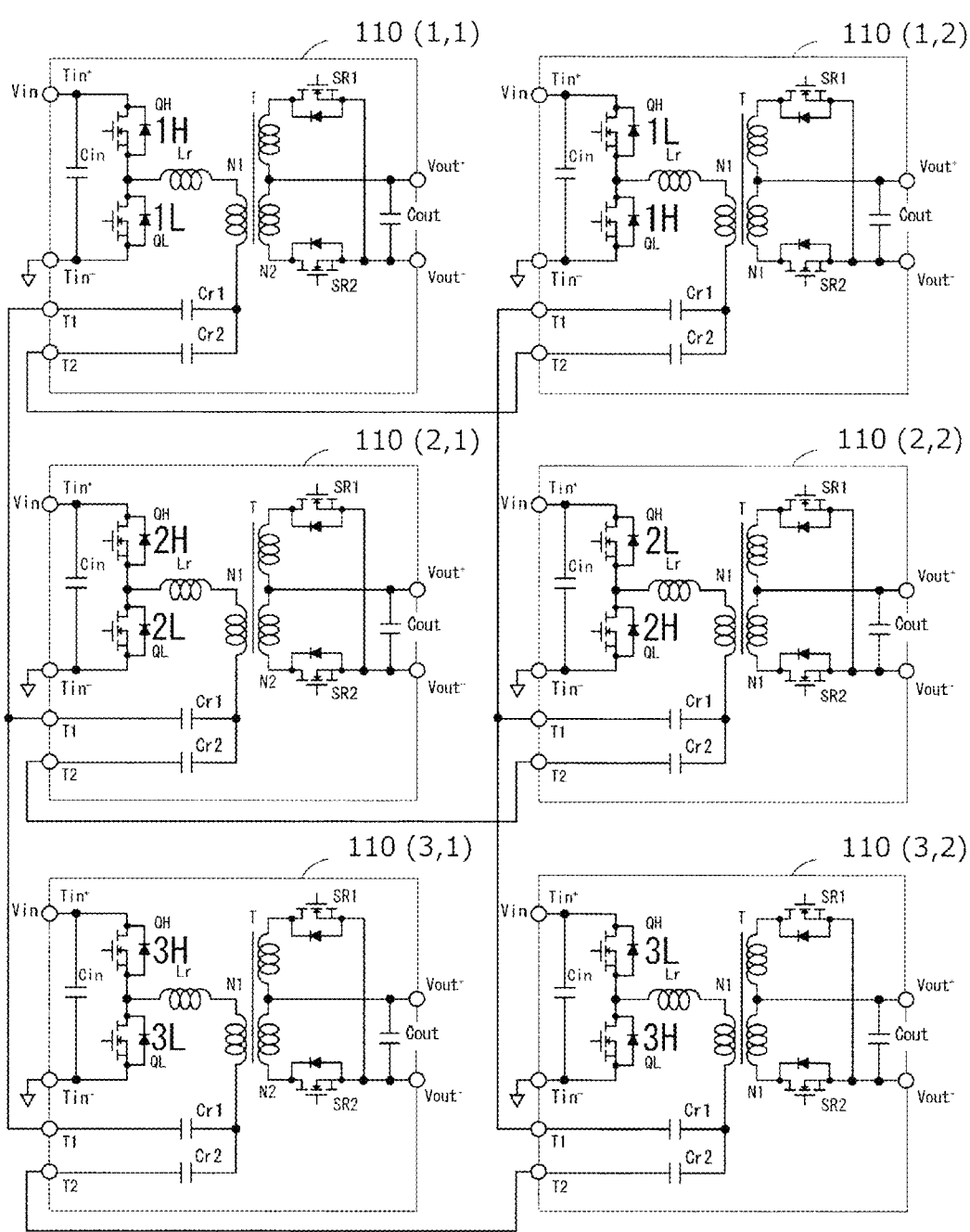
FIG. 15 is a diagram illustrating an example of the multiphase multiplex converter including six circuit elements.

For the sake of simplicity, switching of the number of circuits will be described exemplifying a multiphase multiplex converter including six of the circuit elements 110 illustrated in FIG. 15, by which a three-phase LLC converter in a one-dimensional direction and a two-phase LLC converter in a two-dimensional direction are constructed. In FIG. 15, as to (x, y) attached to each of the circuit elements 110, x indicates a phase in a one-dimensional direction, and y indicates a phase in a two-dimensional direction. That is, x=1 indicates phase of zero, x=2 indicates a phase of 360°/3=120°, x=3 indicates a phase of 2×360°/3=240°, y=1 indicates a phase of zero, and y=2 indicates a phase of 360°/2=180°.

Figure 16:
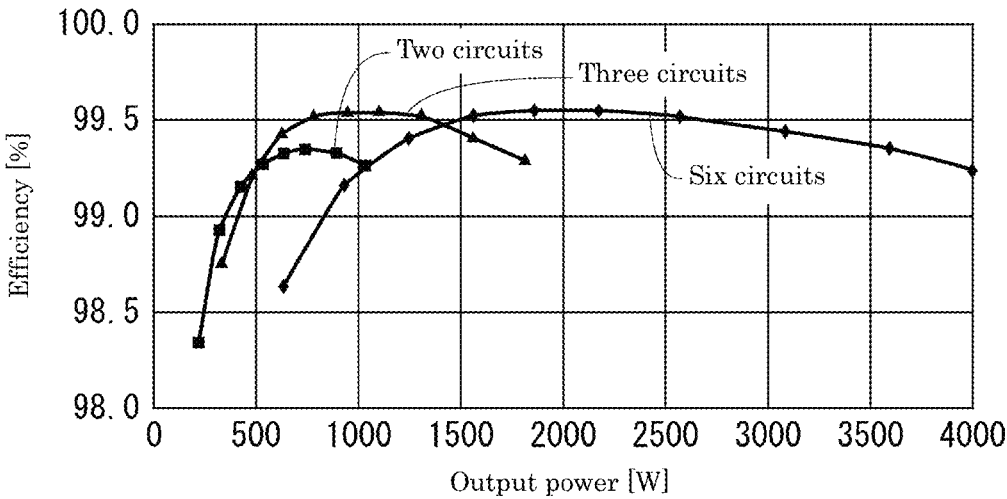
FIG. 16 is an efficiency graph for explaining operation of the multiphase multiplex converter illustrated in FIG. 15.

FIG. 16 illustrates an efficiency graph when only elements (1, 1) and (1, 2) are operated at the time of light loading (when output power is small), only elements (1, 1), (2, 1), and (3, 1) are operated as a load increases, and six circuit elements are operated at the time of heavy loading.

Capacities of the resonant capacitors Cr1 and Cr2 of each of the circuit elements 110 are set as αCr and βCr, respectively, and are set as in Formula (13) below.

[Mathematical formula 13]

$$\alpha + \beta = 1 \qquad (13)$$

In this case, the resonance frequency ωr when all six of the circuit elements 110 are operating is expressed by Formula (14) below.

[Mathematical formula 14]

$$\omega r = \frac{1}{\sqrt{Lr \cdot (\alpha + \beta)\, Cr}} = \frac{1}{\sqrt{LrCr}} \qquad (14)$$

Although operation is not performed only with one half-bridge LLC circuit element like the circuit element (1,1), the resonance frequency ωr, 2φ when only two half-bridge LLC circuit elements operate in a two-dimensional direction like the circuit elements (1, 1) and (1, 2) is expressed by Formula (15) below.

[Mathematical formula 15]

$$\omega_{r.2\phi} = \frac{1}{\sqrt{LrCr_{.2\phi}}} = \omega r = \sqrt{\frac{3-2\alpha}{3(1-\alpha)}} \qquad (15)$$

Similarly, the resonance frequency ωr, 3φ when only three half-bridge LLC circuit elements operate in a one-dimensional direction like the circuit elements (1, 1), (2, 1), and (3, 1) is expressed by Formula (16) below.

[Mathematical formula 16]

$$\omega_{r.3\phi} = \frac{1}{\sqrt{LrCr_{.3\phi}}} = \omega r = \sqrt{\frac{1+\alpha}{2\alpha}} \qquad (16)$$

When α=β=½, with respect to a resonance frequency at the time of six circuit operation, a resonance frequency at the time of one circuit operation increases by 25.8%, at the time of two circuit operation increases by 8%, and at the time of three circuit operation increases by 11.8%. An actual switching frequency is almost the same.

As described above, by switching operation and stop of the multidimensional circuit elements 110 instead of simply switching the number of operation phases of multiple phases, efficiency can be maintained according to a load.

As described above, according to the present embodiment, a plurality of (Σ) half-bridge LLC converters including the first switch element QH and the second switch element QL connected in series between a positive electrode and a negative electrode of the DC power supply Vin, and the resonant reactor Lr having one end connected to a connection point between the first switch element QH and the second switch element QL, the primary winding N1 of the transformer T, and a resonance circuit including n (n is a natural number of two or more) of a first order resonant capacitor (the resonant capacitors Cr1) to n-th order resonant capacitor (the resonant capacitors Crn) are included as the circuit elements 110, and the resonant capacitor Crk (k is a natural number of one to n) of the circuit element 110 has one end not connected to a negative electrode of the DC power supply Vin via a capacitor, and connected in series to the resonant reactor and a primary winding of the transformer, another end connected to the resonant capacitor Crk of another one of the circuit elements 110 so that a k-dimensional multiphase LLC converter with a phase difference of 360°/Pk is constructed by Pk (Pk is any natural number) of the circuit elements 110.

With this configuration, in the present embodiment, the number of complementary gate drive signals can be made smaller than the total number Σ of the circuit elements 110, and the number of complementary gate drive signals is not increased. In the present embodiment, since a capacitor connected to a negative electrode of the DC power supply Vin is omitted, it is easy to balance current. In the present embodiment, the total number Σ of the circuit elements 110 can be increased, and high power can be increased by balancing current between the circuit elements 110.

According to the present embodiment, the total number Σ of the circuit elements 110 is a product of the numbers of phases included in the dimensions (Σ=P1×P2×, . . . , ×Pn). With this configuration, by increasing the number of dimensions, the total number Σ of the circuit elements 110 can be exponentially increased, and it is possible to cope with increase in power.

If the numbers of phases Pk in one to n dimensions are set to be identical, the same complementary gate drive signal $G_{Pk(1\ to\ n)}$ can be used in each dimension, and power expansion can be easily performed by multiple phases without making a circuit related to control large in scale.

According to the present embodiment, the dimension selection circuit 42 that selects operation and stop of the circuit element 110 in units of dimension, and the selection signal generation circuit 30 that generates the dimension selection signal Yk that controls the dimension selection circuit 42 are included.

With this configuration, it is possible to maintain efficiency by switching the number of operation circuits according to a load. Furthermore, by using the phase selection circuit 41 that selects operation and stop of the circuit element 110 in units of phase, it is possible to maintain efficiency in a wide range from light loading in which only one of the circuit elements 110 is operated to heavy loading in which all the circuit elements 110 are operated.

Although the present invention is described above with reference to the specific embodiment, it is needless to say that the above-described embodiment is an example and can be modified and implemented without departing from the spirit of the present invention.

In the above embodiment, the resonant reactor Lr is physically provided in each of the circuit elements 10. Alternatively, the resonant reactor Lr may use leakage inductance of a transformer.

The invention claimed is:

1. A switching power supply device comprising:
a plurality of half-bridge LLC converters each configured as a circuit element, each of the plurality of half-bridge LLC converters including:
a first switch element and a second switch element connected in series between a positive electrode and a negative electrode of a DC power supply; and
a resonant circuit including a resonant reactor having one end connected to a connection point between the first switch element and the second switch element, a primary winding of a transformer, and n+1 resonant capacitors comprising a $zero^{th}$ order resonant capacitor to an $n^{th}$ order resonant capacitor, wherein n is a natural number equal to three or greater,
wherein in each circuit element the $zero^{th}$ order resonant capacitor has one end connected in series to the respective resonant reactor and the respective primary winding of the respective transformer, and another end connected to a respective power supply line, and
wherein in each circuit element a $k^{th}$ order resonant capacitor of the n+1 resonant capacitors of each circuit element has one end connected in series to the respective resonant reactor and the respective primary winding of the respective transformer, and another end connected to another $k^{th}$ order resonant capacitor of one or more other circuit elements so that a k dimensional multiphase LLC converter having a phase difference of 360°/Pk is constructed by Pk circuit elements, wherein k is a natural number between one and n, and Pk is a natural number equal to or greater than one.

2. The switching power supply device according to claim 1, wherein a total number of circuit elements is a product of numbers of phases included in dimensions.

3. The switching power supply device according to claim 1,
wherein numbers of phases in one to n dimensions are set to be identical.

4. The switching power supply device according to claim 1, further comprising:
a dimension selection circuit that selects operation and stop of the circuit element in units of dimension; and
a selection signal generation circuit that generates a dimension selection signal for controlling the dimension selection circuit.

5. The switching power supply device according to claim 1, wherein the circuit elements are modularized and connected in a multidimensional manner, the modularized circuit elements including n+1 of the resonant capacitors.

6. The switching power supply device according to claim 1, wherein the circuit elements are modularized and connected in a multidimensional manner, the modularized circuit elements being provided with a resonant capacitor additional terminal for dimension expansion to which n of the n+1 of the resonant capacitors are connectable.

7. The switching power supply device according to claim 1, wherein a plurality of Pk phase LLC converters are modularized and connected in a multidimensional manner, the modularized Pk phase LLC converters including Pk of the circuit elements.

* * * * *